UNITED STATES PATENT OFFICE.

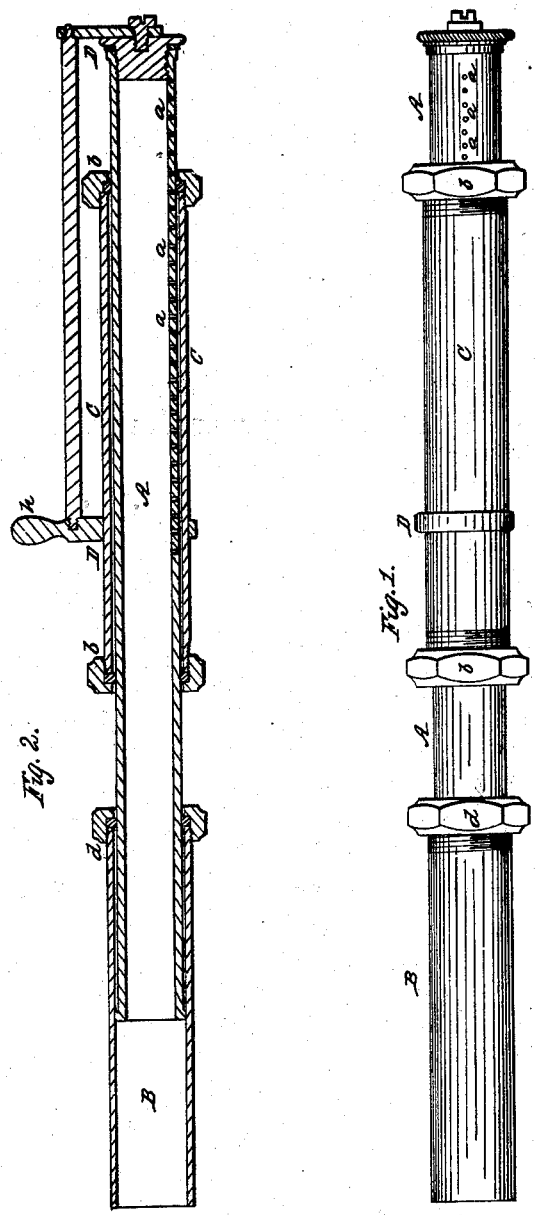

FRANK SEIBERLICH, OF CHARLESTOWN, MASSACHUSETTS.

IMPROVED APPARATUS FOR LIQUORING SUGAR IN CENTRIFUGAL MACHINES.

Specification forming part of Letters Patent No. 49,310, dated August 8, 1865.

*To all whom it may concern:*

Be it known that I, FRANK SEIBERLICH, of Charlestown, in the county of Middlesex and State of Massachusetts, have invented a new and useful Apparatus for Liquoring Sugar in Centrifugal Machines; and I do hereby declare the same to be fully described in the following specification and represented in the accompanying drawings, of which—

Figure 1 is a side elevation, and Fig. 2 a longitudinal and vertical section, of my invention.

The centrifugal machine is well known to and in common use by sugar-refiners, and is employed by them for separating a liquid from a mass of sugar, as well as for cleansing the mass. The machine is a cylindrical drum having its sides foraminous, and while in use is put in rotation with great velocity, so as to discharge through its sides by centrifugal force the liquor from a quantity of sugar when within it. The sugar, in consequence of the centrifugal force, will be spread on the inner periphery of the drum. For liquoring such sugar it has been customary to introduce into the drum while in motion a jet-pipe and discharge therefrom, through numerous orifices made in it, several fine streams of water or liquid against the exposed surface of the sugar. This jet-pipe has been attached to a flexible hose or conduit. Dangerous accidents have happened and are likely to occur from its use. The operative who introduces it has to be exceedingly careful not to allow the jet-pipe to touch the sugar, as the velocity of the mass is usually so great that were he to do so the pipe would be instantly thrown from his grasp, and perhaps his arm be broken. Not only have persons had their arms broken, but in one case the arm was wrenched off at the elbow from such cause. It is the purpose of my invention to prevent these accidents.

In the drawings, A denotes a jet-tube, closed at bottom and open at its top, and inserted within a conduit, B, and applied thereto so as to be capable of being slid longitudinally therein. The tube A has a series of small jet holes or perforations, *a a a*, made through its side, and it is furnished with an encompassing tube or gate, *c*, which slides freely on it, and has a stuffing-box, *b*, at each extremity. There is also a stuffing-box, *d*, at the lower end of the conduit B and going around the jet-tube. Futhermore, a lifter, D, is attached to the lower end of the jet-tube and rises therefrom, and is formed as shown in the drawings. It encompasses and slides freely on the tube or gate C.

In the use of the liquoring apparatus above described it is to be arranged immediately over the open end of the centrifugal machine of the kind hereinbefore mentioned, and so that the jet-tube may be raised out of and depressed into the drum to the necessary extent, the said tube, while being so moved, being slid within the conduit. Under these circumstances the handle *h* of the lifter will be out of the centrifugal machine. On depressing the lifter the jet-tube and the gate will be forced down into the drum of the machine, after which the gate may be raised on the jet-tube to such an elevation as may be required to uncover the series of jet-holes or any portion thereof. On raising the lifter the jet-tube will be drawn up with it and into the gate and the conduit. Thus the jet-holes will be closed during the act of elevating the jet-pipe out of the drum.

From the above it will be seen that an operative, while managing the apparatus, has no need whatever of reaching into the drum, and therefore there will be no liability of the occurrence of such accidents as hereinbefore mentioned.

What I claim as my invention is—

1. The combination of the jet-tube A, the gate C, and the conduit B, applied together substantially as and for the purpose specified.

2. The combination of the lifter D, the jet-tube A, the gate C, and the conduit B, the whole being arranged and so as to operate together substantially in manner as described.

FRANK SEIBERLICH.

Witnesses:
R. H. EDDY,
F. P. HALE, Jr.